United States Patent
Hasegawa et al.

(10) Patent No.: US 8,337,658 B2
(45) Date of Patent: Dec. 25, 2012

(54) MANUFACTURING METHOD FOR COMPOSITE MATERIAL STRUCTURAL COMPONENT FOR AIRCRAFT AND ITS STRUCTURAL COMPONENT

(75) Inventors: Kenichi Hasegawa, Hyogo (JP); Tohru Ikuyama, Hyogo (JP); Masahiko Ikeda, Hyogo (JP); Takuji Kocho, Hyogo (JP)

(73) Assignee: Shinmaywa Industries, Ltd. (JP)

( * ) Notice: Subject to any disclaimer, the term of this patent is extended or adjusted under 35 U.S.C. 154(b) by 480 days.

(21) Appl. No.: 12/259,414

(22) Filed: Oct. 28, 2008

(65) Prior Publication Data
US 2009/0107620 A1  Apr. 30, 2009

(30) Foreign Application Priority Data
Oct. 31, 2007 (JP) .................................. 2007-282886

(51) Int. Cl.
*B29C 65/00* (2006.01)
*B32B 37/00* (2006.01)

(52) U.S. Cl. ............... 156/273.3; 156/272.2; 156/275.7; 156/308.2; 156/308.4; 156/321; 156/379.6; 156/379.7

(58) Field of Classification Search ............... 156/273.9, 156/379.7, 272.2, 275.1–275.7, 379.6, 308.2, 156/308.4, 273.3, 321
See application file for complete search history.

(56) References Cited

U.S. PATENT DOCUMENTS

| | | | | |
|---|---|---|---|---|
| 4,313,777 A | * | 2/1982 | Buckley et al. | 156/272.2 |
| 4,737,618 A | | 4/1988 | Barbier et al. | |
| 2008/0166563 A1 | * | 7/2008 | Brittingham et al. | 428/411.1 |

FOREIGN PATENT DOCUMENTS

| | | |
|---|---|---|
| JP | S61-157495 A | 7/1986 |
| JP | H02-196625 A | 8/1990 |
| JP | H05-031808 A | 2/1993 |
| JP | H06-297632 A | 10/1994 |
| JP | 08-264268 | 10/1996 |
| JP | H11-034198 A | 2/1999 |
| JP | 2001-278195 | 10/2001 |
| JP | 2004-017878 | 1/2004 |
| JP | 2004-025925 | 1/2004 |
| JP | 2006-219078 | 8/2006 |
| WO | 9915405 | 4/1999 |

* cited by examiner

*Primary Examiner* — Khanh P Nguyen
*Assistant Examiner* — Carson Gross
(74) *Attorney, Agent, or Firm* — Studebaker & Brackett PC; Donald R. Studebaker

(57) ABSTRACT

A method for manufacturing a structural component includes a first step of attaching at least one conductive member to a surface of a base material made of a composite material and a second step of forming the base material by conducting electricity to part or the whole of the conductive member to generate heat and/or making an assembly of the structural component by conducting electricity to part or the whole of the conductive member to generate heat. Part or the whole of the conductive member contained in the structural component produced in the first and second steps serves as a member giving to the aircraft at least one of a lightning strike protection function, an anti-icing and deicing function and an electromagnetic interference shielding function.

6 Claims, 3 Drawing Sheets

MANUFACTURING METHOD FOR COMPOSITE MATERIAL STRUCTURAL COMPONENT FOR AIRCRAFT AND ITS STRUCTURAL COMPONENT

BACKGROUND OF THE INVENTION (a) Field of the Invention

This invention relates to methods for manufacturing a composite material structural component constituting part of an aircraft and to composite material structural components for aircraft.

(b) Description of the Related Art

The bodies of aircraft in flight, particularly, the leading edges of their wings, are often ice-coated. Such icing impairs the aerodynamics of aircraft. To cope with this, a technique is conventionally known in which an electric heater or a heat source using exhaust heat from the engine is attached to a part of the outer surface of a structural component of the aircraft likely to be ice-coated (see, for example, WO99/15405).

As disclosed also in the above gazette, composite materials have been recently used as structural components of aircraft. Such a composite material structural component, particularly its portions likely to be struck by lightning, such as wing leading edges, must have a lightning strike protection function to prevent damage from lightning strike. An example of such a lightning strike protection function is a structure in which a metal mesh is disposed on the outer surface of the composite material structural component, as disclosed, for example, in Published Japanese Patent Application No. 2006-219078.

SUMMARY OF THE INVENTION

For example, in manufacturing an aircraft structural component from a thermoplastic composite material, there may be a case where a conductive member, such as a metal mesh or a metal foil, is attached to the surface of the composite material and heat produced by conduction of electricity to the conductor is used to make an assembly (for example, join parts of composite material together) or carry out a forming process (for example, soften the composite material and bend it).

If a structural component is manufactured from a composite material using the above technique, a conductive member for heating the composite material is necessary and may be left inside the structural component without being removed after the completion of the structural component. Thus, the structural component includes an unnecessary member for the product. This means needless increase in the weight of the aircraft body.

On the other hand, in the process for manufacturing an aircraft structural component from a thermosetting composite material, an autoclave or an oven is used to heat and set a base material for production of parts or to secondarily bond thermally set parts to each other with an adhesive film. Also in producing parts from a thermoplastic composite material, an autoclave or the like may be used. Such an autoclave and an oven are expensive facilities. Therefore, there is a demand for a manufacturing method for a composite material structural component without using the expensive facilities.

The present invention has been made in view of the foregoing points and, therefore, an object of the present invention is to eliminate needless weight increase of an aircraft due to a conductive member included in an aircraft composite material structural component and in turn reduce the necessary cost for manufacturing facilities.

An aspect of the present invention is directed to a method for manufacturing a structural component made of a composite material and constituting part of an aircraft. The method includes: a first step of attaching at least one conductive member to a surface of a base material made of the composite material; and a second step of carrying out at least one of forming the base material by conducting electricity to part or the whole of the conductive member to generate heat and making an assembly of the structural component by conducting electricity to part or the whole of the conductive member to generate heat, wherein part or the whole of the conductive member included in the structural component produced through the first and second steps serves as a member giving to the aircraft at least one of a lightning strike protection function, an anti-icing and deicing function and an electromagnetic interference shielding function.

With the above structure, first, in the manufacture, heat is generated by conducting electricity to the conductive member attached to the surface of the base material made of a composite material and the base material is heated by the generated heat. Thus, the formation of the base material and/or the assembly of the structural component is carried out to form the structural component.

The conductive member included in the structural component produced in the above manner serves as a structural member giving to the aircraft at least one of a lightning strike protection function, an anti-icing and deicing function and an electromagnetic interference shielding function. In other words, the conductor for lightning strike protection, the conductor as a heat source for anti-icing and deicing, and/or the conductor for electromagnetic interference shielding is used as a heat source in manufacturing the structural component.

The conductive member used as a heat source in manufacturing the structural component is inherently an unnecessary member in a product. The use of the conductive member, however, as the conductor for lighting strike protection, the heat source for anti-icing and deicing, and/or the conductor for electromagnetic interference shielding prevents an unnecessary increase in weight of the aircraft body.

Furthermore, since the conductive member is used as a heat source, the structural component can be manufactured without using an expensive facility, such as an autoclave or an oven.

When the composite material is a thermoplastic composite material, the base material and the conductive member may be joined together by melting a thermoplastic resin in the thermoplastic composite material through the heat generation of the conductive member.

Furthermore, when the composite material is a thermoplastic composite material, the base material may be deformed (for example, bent) by softening the base material through the heat generation of the conductive member.

Alternatively, when the composite material is a thermosetting composite material, the base material and the conductive member may be bonded together by setting an adhesive film through the heat generation of the conductive member.

Furthermore, when the composite material is a thermosetting composite material, the base material may be set through the heat generation of the conductive member.

Furthermore, when the composite material is a thermosetting composite material, parts of the base material or the base material and the conductive member may be bonded together by setting a thermosetting resin in the thermosetting composite material through the heat generation of the conductive member.

Particularly according to the method for manufacturing a composite material structural component using a thermosetting composite material, the setting of the base material or the thermal setting of the adhesive film can be implemented by conducting electricity to the conductive member to generate heat. This eliminates the need to use an expensive facility, such as an autoclave or an oven.

Another aspect of the present invention is directed to a structural component made of a composite material and constituting part of an aircraft. Furthermore, the structural component includes a composite part made of the composite material and a conductor part made of a conductive material, and the conductor part serves as a part that gives to the aircraft at least one of a lightning strike protection function, an anti-icing and deicing function and an electromagnetic interference shielding function and functions as a heating element for at least one of formation of the composite material and assembly of the structural component in manufacturing the structural component.

Still another aspect of the present invention is directed to a structural component made of a composite material and constituting part of an aircraft. Furthermore, the structural component includes a composite part made of the composite material and a conductor part made of a conductive material, and the conductor part serves as a part that gives to the aircraft at least two of a lightning strike protection function, an anti-icing and deicing function, an electromagnetic interference shielding function, a function of a heating element for formation of the composite material in manufacturing the structural component and a function of a heating element for assembly of the structural component in manufacturing the structural component. In other words, the conductor part has at least two functions, which correspondingly reduces the weight of the aircraft body.

As described above, according to the present invention, the conductive member included in the composite material structural component for an aircraft provides a part giving at least two functions. In an example, the conductive member serving as a conductor for protection against lightning strike, a heat source for anti-icing and deicing and/or an electromagnetic interference shield in a finished aircraft is used as a heat source in manufacturing the structural component. Thus, the number of conductive members included in the structural component is reduced, thereby reducing the weight of the aircraft body and reducing the manufacturing cost of the aircraft. In addition, since no expensive manufacturing facility is needed, the cost for the manufacturing facility can be reduced.

DETAILED DESCRIPTION OF THE INVENTION

Embodiment 1

Figure 1:
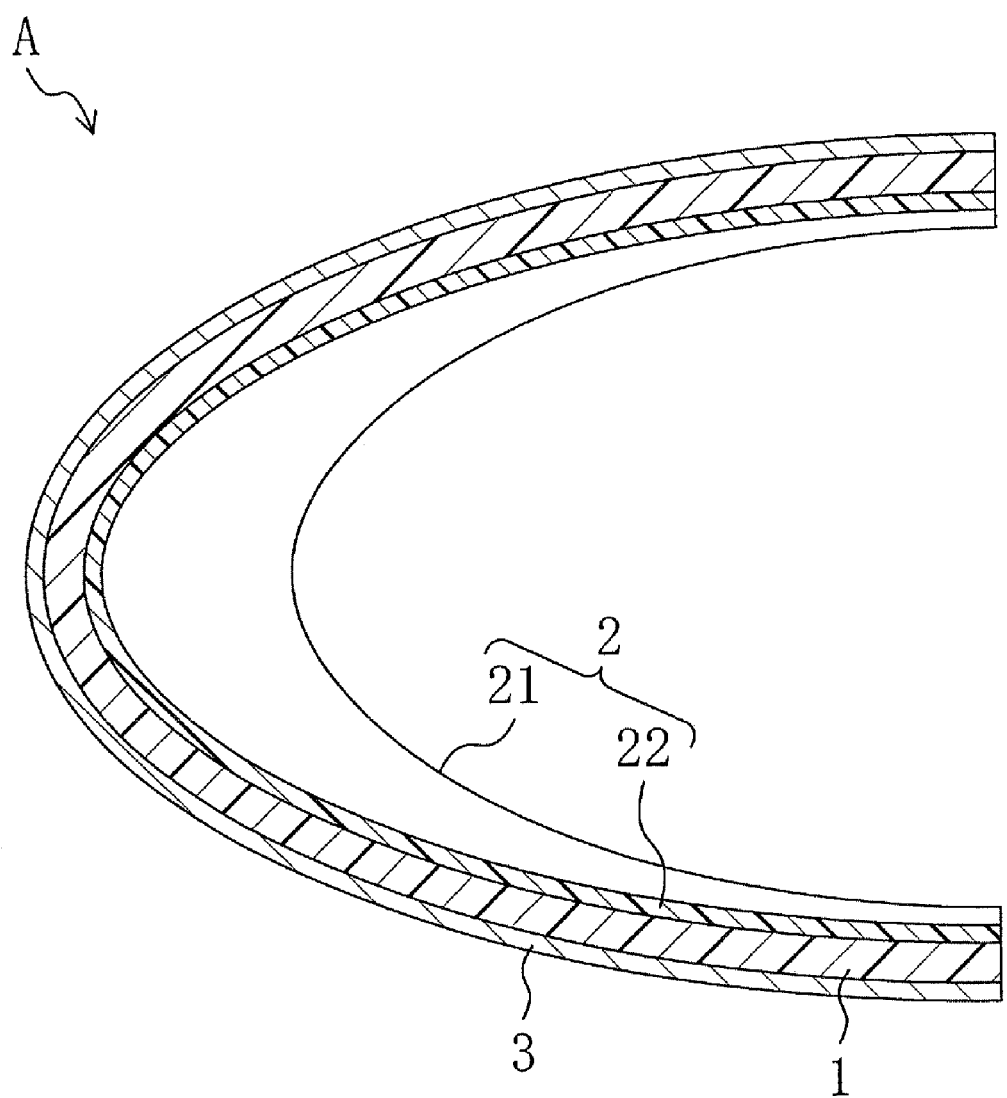
FIG. 1 is a cross-sectional view of an aircraft structural component according to Embodiment 1 of the present invention (cross-sectional view taken along the line I-I of FIG. 2).

FIG. 1 shows an aircraft structural component A according to Embodiment 1 of the present invention. The structural component A is a structural component constituting the leading edge of a wing in this embodiment. However, the structural component A according to the present invention is not limited to the above structural component. For easy understanding, FIG. 1 expresses the thicknesses of layers constituting the cross section of the structural component A in a different manner from their actual thicknesses.

Figure 2:
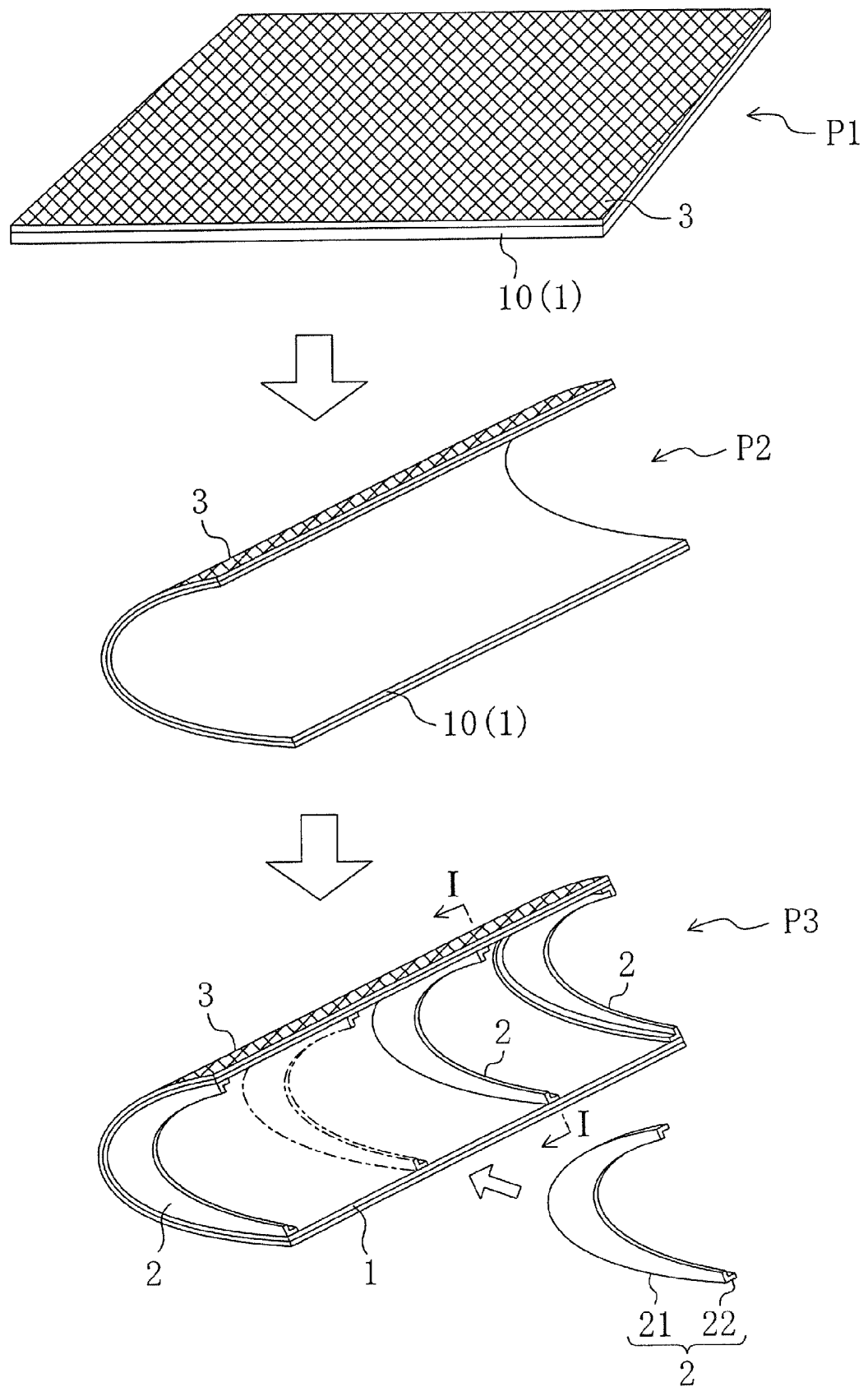
FIG. 2 is a diagram illustrating a manufacturing procedure of the structural component.

As shown in FIG. 2, the structural component A includes an outer plate 1 having a cross section curved substantially in the shape of the letter U and extending in the direction of the wing span, and a plurality of ribs 2 joined to the inner surface of the outer plate 1 at specified intervals in the direction of the wing span. Although not shown, beads may be formed on the inner surface of the outer plate 1.

Each rib 2 includes an arcuate web 21 curved around the inner surface of the outer plate 1 and a flange 22 extending laterally from the outer edge of the web 21 and having a joint surface (outward surface) adjoining the inner surface of the outer plate 1 and joined to it. The cross section of the rib 2 has substantially the shape of the letter L.

The outer plate 1 and the ribs 2 constituting the structural component A are made of a thermoplastic composite material in this embodiment.

As shown in FIG. 1, a metal mesh 3 made such as of copper or aluminum is attached to the outer surface of the outer plate 1 over the entire outer surface. The metal mesh 3 is a mesh functioning as a conductor for lightning strike protection placed on the wing surface in a finished aircraft.

Next, the manufacturing procedure of the structural component A is described with reference to FIG. 2. First, a board-shaped base material 10 made of a thermoplastic composite material is prepared and a metal mesh 3 is attached to the surface of the base material 10. As described later, the base material 10 and the metal mesh 3 can be fixed to each other in the later process. Therefore, the attachment of the metal mesh 3 to the base material 10 may be temporary attachment. Alternatively, the metal mesh 3 may be fixed to the base material 10 such as by an adhesive (see Process P1 in FIG. 2).

Next, electricity is conducted to the metal mesh 3 to allow the metal mesh 3 to generate heat. Thus, the base material 10 is heated, whereby the thermoplastic resin contained in the base material 10 softens and melts. Using the melting of the thermoplastic resin, the metal mesh 3 can be fixed to the surface of the base material 10. In addition, the softening of the thermoplastic resin enables the deformation of the base material 10. Therefore, the base material 10 is bent and formed into the shape of the above-stated outer plate 1 such as by press working (see Process P2 in FIG. 2).

Furthermore, prepared are ribs 2 made of a thermoplastic composite material and formed in a predetermined arcuate shape in an unshown separate process. The ribs 2 are joined to the outer plate 1. Specifically, the ribs 2 are pressed against predetermined attachment points of the outer plate 1 while the outer plate 1 is heated by conducting electricity to the metal mesh 3, whereby the joint surfaces of the flanges 22 of the ribs 2 are joined to the inner surface of the outer plate 1 (see Process P3 in FIG. 2).

Thus, a structural component A including an outer plate 1 and a plurality of ribs 2 is completed. Throughout the above manufacturing processes, the metal mesh 3 used for heating the base material 10 remains attached to the outer surface of the outer plate 1. After the structural component A is assembled into the body of an aircraft to constitute part of a wing of the aircraft, the metal mesh 3 is subjected to a necessary treatment in order to function as a conductor for lightning strike protection.

Since in this manner the metal mesh 3 to be used as a conductor for lightning strike protection is used, in the manufacture, as a heat source for forming the base material 10 and assembling the structural component A, this eliminates the need to additionally attach a heat source for the manufacture, thereby correspondingly reducing the number of conductive members as heat sources contained in the structural component A and reducing the weight of the aircraft body. Furthermore, since the process of attaching a conductor as a heat source in the manufacture is dispensed with, this reduces the manufacturing cost coupled with reduction of the number of parts.

Embodiment 2

Figure 3:
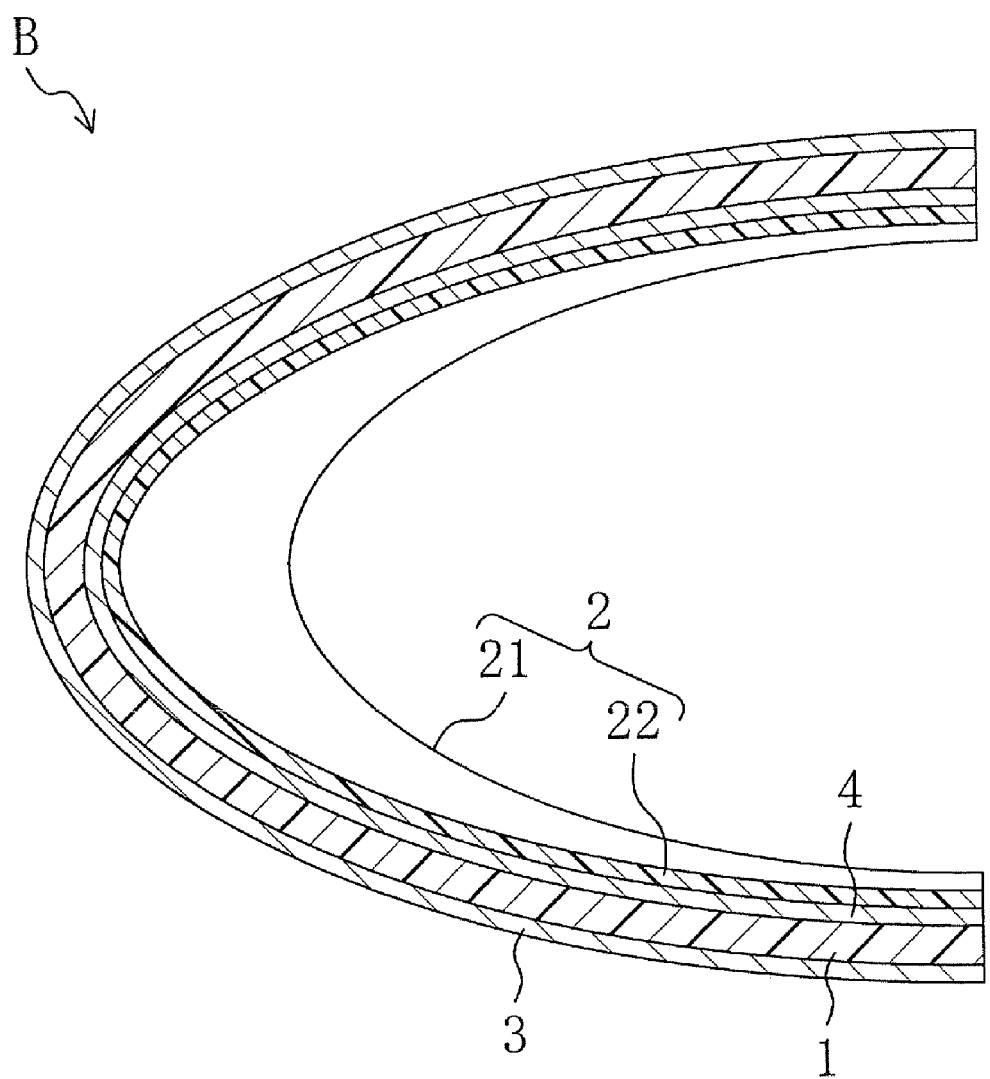
FIG. 3 is a cross-sectional view of an aircraft structural component according to Embodiment 2 of the present invention (corresponding view of FIG. 1).

FIG. 3 shows an aircraft structural component B (the leading edge of a wing) according to Embodiment 2 of the present invention. This structural component B is different from the structural component A shown in FIG. 1 in that a metal mesh 4 is interposed between the flanges 22 of ribs 2 and the inner surface of an outer plate 1. The metal mesh 4 functions as a heat source for anti-icing and deicing in the aircraft.

In manufacturing the structural component B according to Embodiment 2, in Process P3 of the manufacturing procedure shown in FIG. 2, the metal mesh 4 is attached to the joint surfaces of the flanges 22 of the ribs 2 and the ribs 2 are pressed against the predetermined attachment points of the outer plate 1 while the flanges 22 are heated by conduction of electricity to the metal mesh 4, whereby the ribs 2 and the outer plate 1 are joined. In this case, electricity may be or may not be conducted to the metal mesh 3 attached to the outer plate 1. Processes P1 and P2 are carried out in the same manner as in Embodiment 1.

Thus, a structural component B including an outer plate 1 and a plurality of ribs 2 is completed. After the structural component B is assembled into the body of an aircraft to constitute part of a wing of the aircraft, the metal mesh 4 used as a heat source for the joining process functions as a heat source for anti-icing and deicing in the aircraft. For this purpose, the metal mesh 4 is appropriately subjected to a necessary treatment.

With the above structure, the metal mesh 3 to be used for a conductor for lightning strike protection is used as a heat source in the manufacture and the metal mesh 4 to be used as a heat source for anti-icing and deicing is also used as a heat source in the manufacture. This correspondingly reduces the number of conductive members contained in the structural component B and reduces the weight of the aircraft body. Furthermore, since the process of attaching the conductor and the heat source is dispensed with, this reduces the manufacturing cost coupled with reduction of the number of parts.

Although not shown, the metal mesh 3 may be dispensed with in Embodiment 2.

Other Embodiments

Although in the above embodiments the conductive member used as a heat source in the manufacture is a metal mesh, any conductive member will do and, for example, the conductive member may be a metal foil.

Furthermore, the metal mesh 3 attached to the surface of the outer plate 1 in Embodiments 1 and 2 may not function as a conductor for lightning strike protection but may be used as a heat source for anti-icing and deicing or may be used as an electromagnetic interference shield, for example. The metal mesh 4 interposed between the flanges 22 of the ribs 2 and the outer plate 1 in Embodiment 2 may not be used as a heat source for anti-icing and deicing but may be used for other purposes. In other words, the functions of the metal meshes 3 and 4 after the manufacture are not limited to specific functions.

Furthermore, the metal mesh 3 attached to the surface of the outer plate 1 may be used to perform two or more functions, such as both of the function as a conductor for lightning strike protection and the function as an electromagnetic interference shield.

Although in the above embodiments the composite material used is a thermoplastic composite material, it may be a thermosetting composite material. In this case, a metal mesh may be used to apply heat to the base material to form (set) it into a predetermined shape or may be used as a heat source for setting an adhesive film in assembling formed parts of the base material by secondary bonding. Alternatively, the metal mesh may be used as a heat source in bonding and setting uncured base materials to each other or bonding the base material and the metal mesh to each other.

The present invention is not limited to the above embodiments but can be implemented in various forms without departing from its spirit and essential characteristics. The above embodiments should therefore be considered in all respects as illustrative only but not restrictive. The scope of the invention is indicated by the claims but not at all restricted to the description. Furthermore, all modifications and changes which come within the range of equivalents of the claims are intended to be embraced within the scope of the invention.

What is claimed is:

1. A method for manufacturing a structural component made of a composite material and constituting part of an aircraft, the method comprising:
   a first step of attaching at least one conductive member to a surface of a base material made of the composite material; and
   a second step of carrying out at least one of forming the base material by conducting electricity to part or the whole of the conductive member to generate heat and making an assembly of the structural component by conducting electricity to part or the whole of the conductive member to generate heat,
   wherein part or the whole of the conductive member attached to an outer surface of the structural component produced through the first and second steps serves as a member giving to the aircraft at least one of a lightning strike protection function, an anti-icing and deicing function and an electromagnetic interference shielding function.

2. The method of claim 1, wherein the composite material is a thermoplastic composite material, and the base material and the conductive member are joined together by melting a thermoplastic resin in the thermoplastic composite material through the heat generation of the conductive member.

3. A method for manufacturing a structural component made of a composite material and constituting part of an aircraft, the method comprising:
   a first step of attaching at least one conductive member to a surface of a base material made of the composite material; and
   a second step of carrying out at least one of forming the base material by conducting electricity to part or the whole of the conductive member to generate heat and making an assembly of the structural component by conducting electricity to part or the whole of the conductive member to generate heat,
   wherein part or the whole of the conductive member attached to an outer surface of the structural component produced through the first and second steps serves as a member giving to the aircraft at least one of a lightning strike protection function, an anti-icing and deicing function and an electromagnetic interference shielding function, the composite material is a thermoplastic composite material, and the base material is deformed by softening the base material through the heat generation of the conductive member.

4. The method of claim 1, wherein the composite material is a thermosetting composite material, and the base material and the conductive member are bonded together by setting an adhesive film through the heat generation of the conductive member.

5. A method for manufacturing a structural component made of a composite material and constituting part of an aircraft, the method comprising:

a first step of attaching at least one conductive member to a surface of a base material made of the composite material; and a second step of carrying out at least one of forming the base material by conducting electricity to part or the whole of the conductive member to generate heat and making an assembly of the structural component by conducting electricity to part or the whole of the conductive member to generate heat, wherein part or the whole of the conductive member attached to an outer surface of the structural component produced through the first and second steps serves as a member giving to the aircraft at least one of a lightning strike protection function, an anti-icing and deicing function and an electromagnetic interference shielding function, the composite material is a thermosetting composite material, and the base material is set through the heat generation of the conductive member.

6. The method of claim 1, wherein the composite material is a thermosetting composite material, and parts of the base material or the base material and the conductive member are bonded together by setting a thermosetting resin in the thermosetting composite material through the heat generation of the conductive member.

* * * * *